US012417006B2

(12) United States Patent
Clary et al.

(10) Patent No.: US 12,417,006 B2
(45) Date of Patent: Sep. 16, 2025

(54) PRIVACY-PRESERVING SHARING ATTRIBUTION FOR ELECTRONIC DEVICES

(71) Applicant: Apple Inc., Cupertino, CA (US)

(72) Inventors: Devin O. Clary, San Francisco, CA (US); Bartosz Ciechanowski, Sunnyvale, CA (US); Glen S. Low, Los Gatos, CA (US); Karthik Sudhir, San Jose, CA (US); Lance T. Parker, San Jose, CA (US); Stephen M. Lottermoser, San Jose, CA (US)

(73) Assignee: Apple Inc., Cupertino, CA (US)

( * ) Notice: Subject to any disclaimer, the term of this patent is extended or adjusted under 35 U.S.C. 154(b) by 608 days.

(21) Appl. No.: 17/739,071

(22) Filed: May 6, 2022

(65) Prior Publication Data

US 2022/0382567 A1 Dec. 1, 2022

Related U.S. Application Data

(60) Provisional application No. 63/195,663, filed on Jun. 1, 2021.

(51) Int. Cl.
*G06F 3/0481* (2022.01)
(52) U.S. Cl.
CPC ................. *G06F 3/0481* (2013.01)

(58) Field of Classification Search
CPC ..................................... G06F 3/0481
See application file for complete search history.

(56) References Cited

U.S. PATENT DOCUMENTS

| | | |
|---|---|---|
| 10,798,035 B2 | 10/2020 | Lewis et al. |
| 11,201,900 B1 * | 12/2021 | Craparo .............. H04L 65/4038 |
| 2011/0214148 A1 * | 9/2011 | Gossweiler, III et al. .................. H04N 5/445 |
| 2016/0036822 A1 * | 2/2016 | Kim et al. ............ H04L 63/102 |
| 2017/0061010 A1 * | 3/2017 | Lee et al. ........... G06F 17/30867 |
| 2021/0209090 A1 * | 7/2021 | Nagai et al. ............ G06F 16/23 |
| 2021/0264648 A1 * | 8/2021 | Robinson .............. G06T 11/203 |
| 2023/0026917 A1 * | 1/2023 | Frolovichev et al. .. H04W 4/08 |

* cited by examiner

*Primary Examiner* — James J Debrow
(74) *Attorney, Agent, or Firm* — BAKERHOSTETLER

(57) ABSTRACT

The subject disclosure provides systems and methods for providing privacy-preserving social attribution for electronic devices. For example, when information is received from a contact of a user at the user's electronic device, various applications at the electronic device may later display the received information. It can be desirable to attribute the displayed information received from the contact to that contact, without exposing identifying information of the contact to the displaying application. Aspects of the subject technology include a system process that generates an image including contact information, that can be rendered in a user interface of an application, without providing the image or the contact information to the application.

21 Claims, 8 Drawing Sheets

PRIVACY-PRESERVING SHARING ATTRIBUTION FOR ELECTRONIC DEVICES

CROSS REFERENCE TO RELATED APPLICATIONS

This application claims the benefit of priority to U.S. Provisional Patent Application No. 63/195,663, entitled "Privacy-Preserving Sharing Attribution for Electronic Devices," filed on Jun. 1, 2021, the disclosure of which is hereby incorporated herein in its entirety.

TECHNICAL FIELD

The present description relates generally to receiving and processing network data, including, for example, privacy-preserving social attribution for electronic devices.

BACKGROUND

Messages, such as text messages sent to electronic devices, can include message content and can include references to external content.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
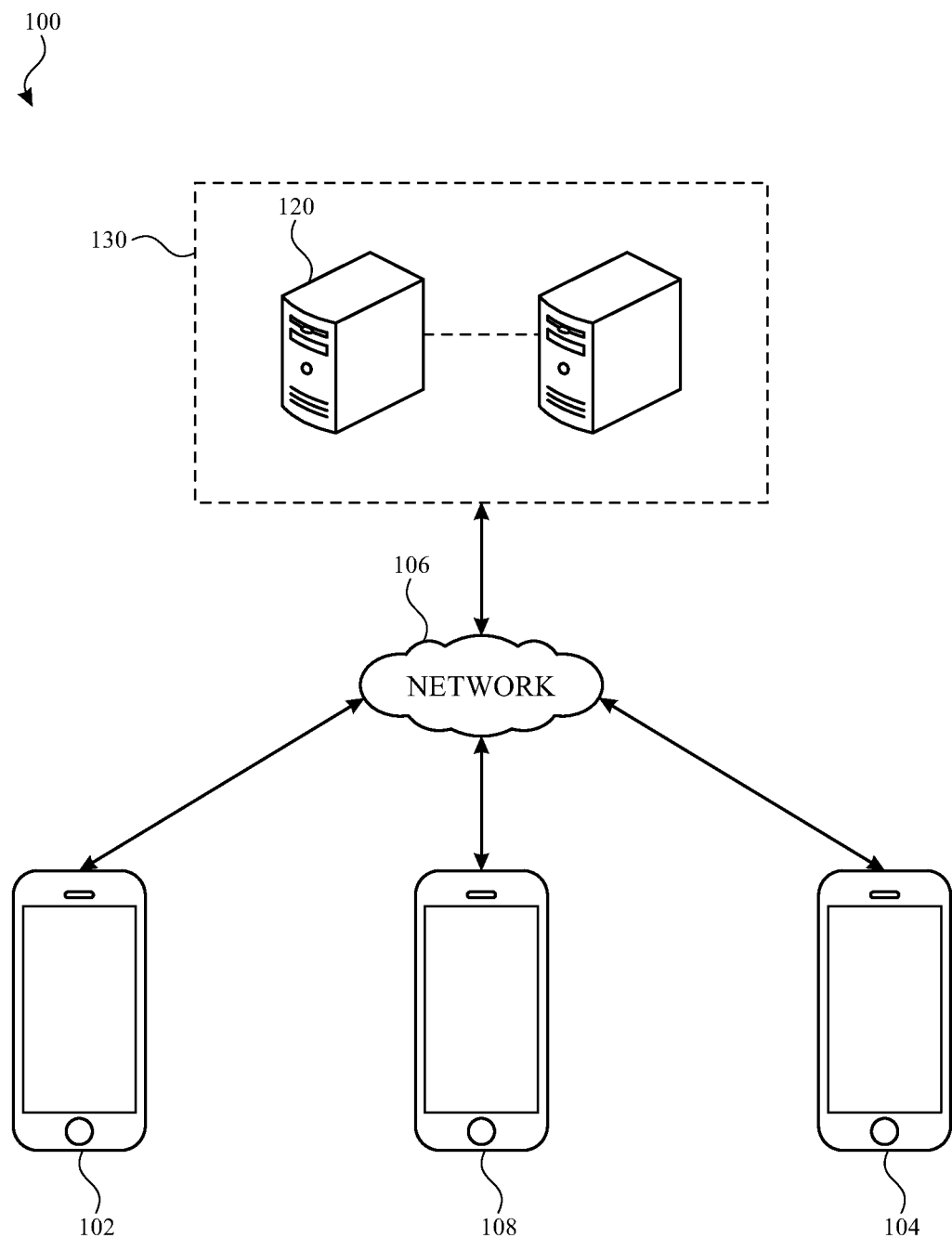
FIG. 1 illustrates an example network environment in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Electronic devices such as personal computers (e.g., desktop computers and laptop computers), portable electronic devices (e.g., tablet computers and smartphones) and wearable devices (e.g., smartwatches, etc.) often include applications that receive and process network data from another device and/or a server over a network. For example, a device may include a messaging application that receives and processes electronic messages (e.g., including text, images, video content, audio content, and/or other objects). In some circumstances, network data, such as a message, can include a link (e.g., a network and/or local identifier) to message content or to external content. For example, a user of an electronic device can send a message to the device of a friend or other contact that includes a link to a recommended news article, a recommended social media post, a recommended restaurant (e.g., a location or a website of the restaurant), a link to a song, a link to a video, or generally any other link to content not included in the message. Although messages are described herein as an example of network data that can be received with a link to internal or external content, it is appreciated that links can be provided between electronic devices via other types of network data, such as a social media post, a blog post, an email, a push notification, a downloaded document, or other communication from a contact (and/or other user) that is known to the user of the receiving electronic device, that is known to the electronic device (e.g., for which the electronic device has stored contact information), and/or for which attribution information for attributing a link to the other user/contact is locally and/or publicly available to the electronic device. In one additional illustrative example, a user of the electronic device may subscribe to a social media feed of another user, and attribution information for a link received via the feed can be obtained from social media account information of the other user.

In some cases, other applications, widgets, or processes, at an electronic device that receives a link from a contact, may (e.g., based on the received link, or separately from the communication from the contact) include the link, and/or other information associated with the link, in a user interface for that other application, widget, or process. In some cases, a user of an electronic device may be more likely to engage with linked content presented by the other application, widget, or process if the user is aware that that same linked content has been referenced and/or recommended by a known contact. It may therefore be beneficial to the other application, widget, or process to include contact identifying information for the known contact in the user interface for that other application, widget, or process, together with the link and/or link-related information. However, it can also be undesirable and/or inefficient for other applications, widgets or processes at an electronic device to have access to identifying information of the contact that provided the link.

In accordance with one or more implementations of the subject technology, attribution of received network data, such as a link, to a contact that provided and/or shared the link can be provided in a way that limits the information that is provided to the attributing application, widget, or process.

In this way, aspects of the subject technology can provide, for example, for privacy-preserving attribution for electronic devices.

FIG. 1 illustrates an example network environment 100 that includes various devices in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes electronic device 102, electronic device 104, electronic device 108, a network 106, and one or more servers 120 communicatively coupled to the network 106. The network, 106 may, for example, be include portions of a public network such as the Internet. The network 106 may include local area network (LAN) components, such as Wi-Fi routers and/or Ethernet connections that are local to each of electronic devices 102 and 104, that couple the corresponding electronic device to the wider Internet. A LAN that connects electronic devices 102, 104, and/or 108 to the Internet may include one or more different network devices/network mediums and/or may utilize one or more different wireless and/or wired network technologies, such as Ethernet, optical, Wi-Fi, Bluetooth, Zigbee, Powerline over Ethernet, coaxial, Z-Wave, generally any wireless and/or wired network technology that may communicatively couple an electronic device to the Internet. Portions of the network 106 include a cellular communications network that includes one or more base transceivers at fixed locations in each of several geographic "cells", the base transceivers communicating wirelessly with end devices such as electronic devices 102, 104, and 108, and via wired and/or satellite communications with various switched networks for voice calls and text messages, mobile data, and public telephony.

Electronic devices 102, 104, and/or 108 may send and/or receive messages such as text messages, multi-media messages, social-media messages and/or other network data, to and/or from each other, and/or to and/or from other electronic devices directly and/or via the network 106. Electronic devices 102, 104, and/or 108 may also receive messages and/or other network data from or via one or more servers such as servers 120. In one or more implementations, network data exchanged between the electronic devices 102, 104, and/or 108 may include links or other references to other data that is available over the network 106, such as from the one or more servers 120.

One or more of the electronic devices 102, 104, and/or 108 may be, for example, a portable computing device such as a laptop computer, a smartphone, a smart speaker, a peripheral device (e.g., a digital camera, headphones), a digital media player, a tablet device, a wearable device such as a smartwatch or a band, or any other appropriate device that includes and/or is communicatively coupled to, for example, one or more wired or wireless interfaces, such as Wi-Fi communications circuitry, cellular communications circuitry, Bluetooth communications circuitry, Zigbee communications circuitry, near field communication (NFC) communications circuitry, and/or other wired or wireless communications circuitry, and is provided with software and/or hardware for sending and receiving network data such as electronic messages.

By way of example, in FIG. 1 each of the electronic devices 102, 104, and/or 108 is depicted as a smart phone.

In one or more implementations, one or more of the electronic devices 102, 104, and/or 108 may be or include a smart television, a laptop or a mobile device, such as a smart phone or a smart watch. In one or more implementations, one or more of the electronic devices 102, 104, and/or 108 may be integrated into its corresponding display device. One or more of the electronic devices 102, 104, and/or 108 may be, and/or may include all or part of, the electronic system discussed below with respect to FIG. 9.

The electronic devices 102, 104, and/or 108 may include a processor, a memory, a communication interface, and/or other electronic components. The processor may include suitable logic, circuitry, and/or code that enable processing data and/or controlling operations of the device. In this regard, the processor may be enabled to provide control signals to various other components of the device. The processor may also control transfers of data between various portions of the device. Additionally, the processor may enable implementation of an operating system or otherwise execute code to manage operations of the device. The memory may include suitable logic, circuitry, and/or code that enable storage of various types of information such as received data, generated data, code, and/or configuration information. The memory may include, for example, random access memory (RAM), read-only memory (ROM), flash, and/or magnetic storage. In one or more implementations, one or more of the processor, the memory, the communication interface, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

One or more of the servers 120 may be, and/or may include all or part of the electronic system discussed below with respect to FIG. 9. Each of the servers 120 may include one or more servers, such as a cloud 130 of servers. For explanatory purposes, two servers are shown and discussed with respect to various operations for providing network data to and/or between electronic devices 102, 104, and/or 108. However, these and other operations discussed herein may be performed by one or more servers, and each different operation may be performed by the same or different servers.

For explanatory purposes, the network environment 100 is illustrated in FIG. 1 as including electronic devices 102, 104, and/or 108, and the servers 120; however, the network environment 100 may include any number of electronic devices and any number of servers.

Figure 2A:
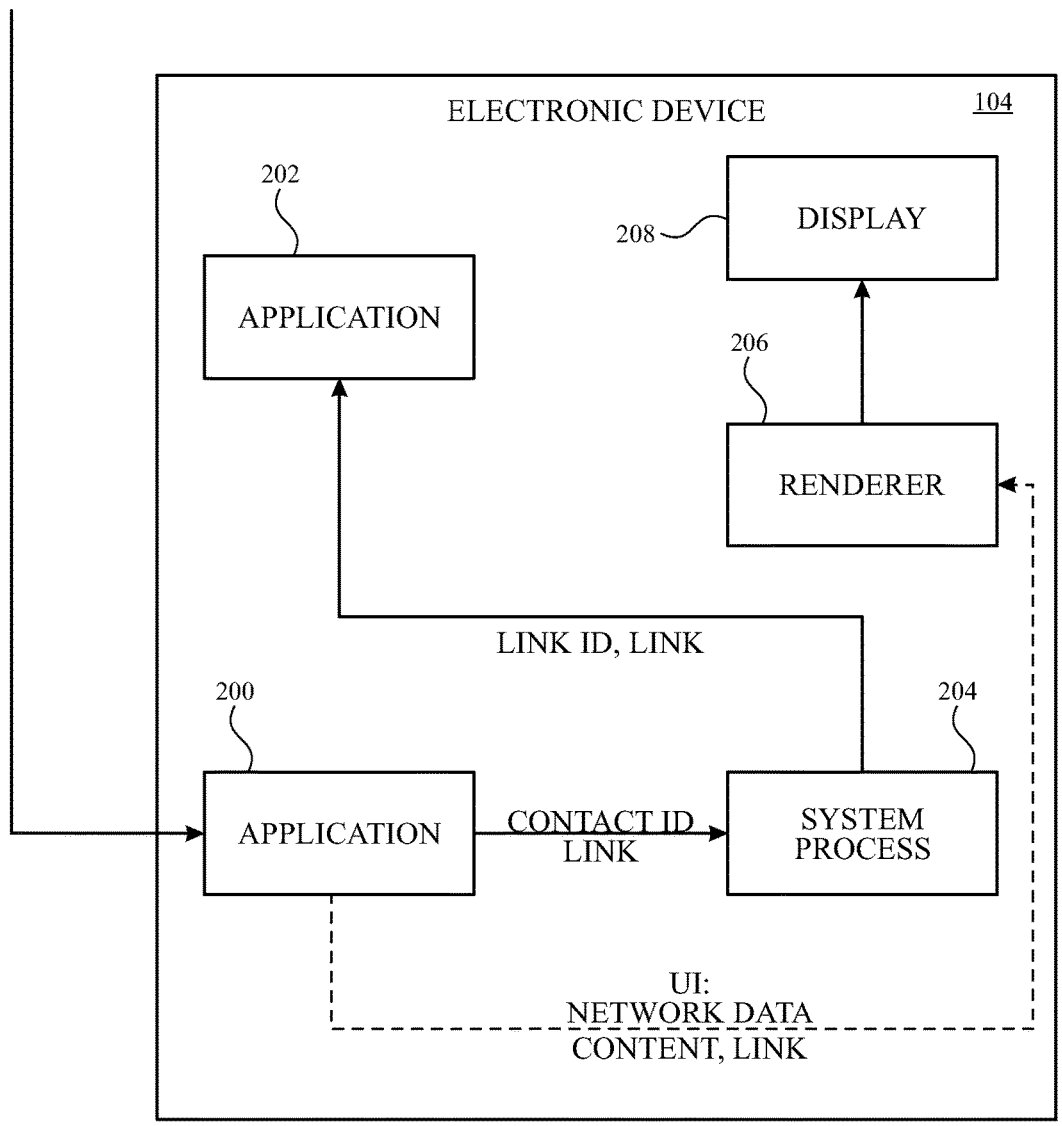
FIGS. 2A and 2B illustrate schematic diagrams of various operations that can be performed by an example electronic device having applications and a system process in accordance with one or more implementations.
Figure 2B:
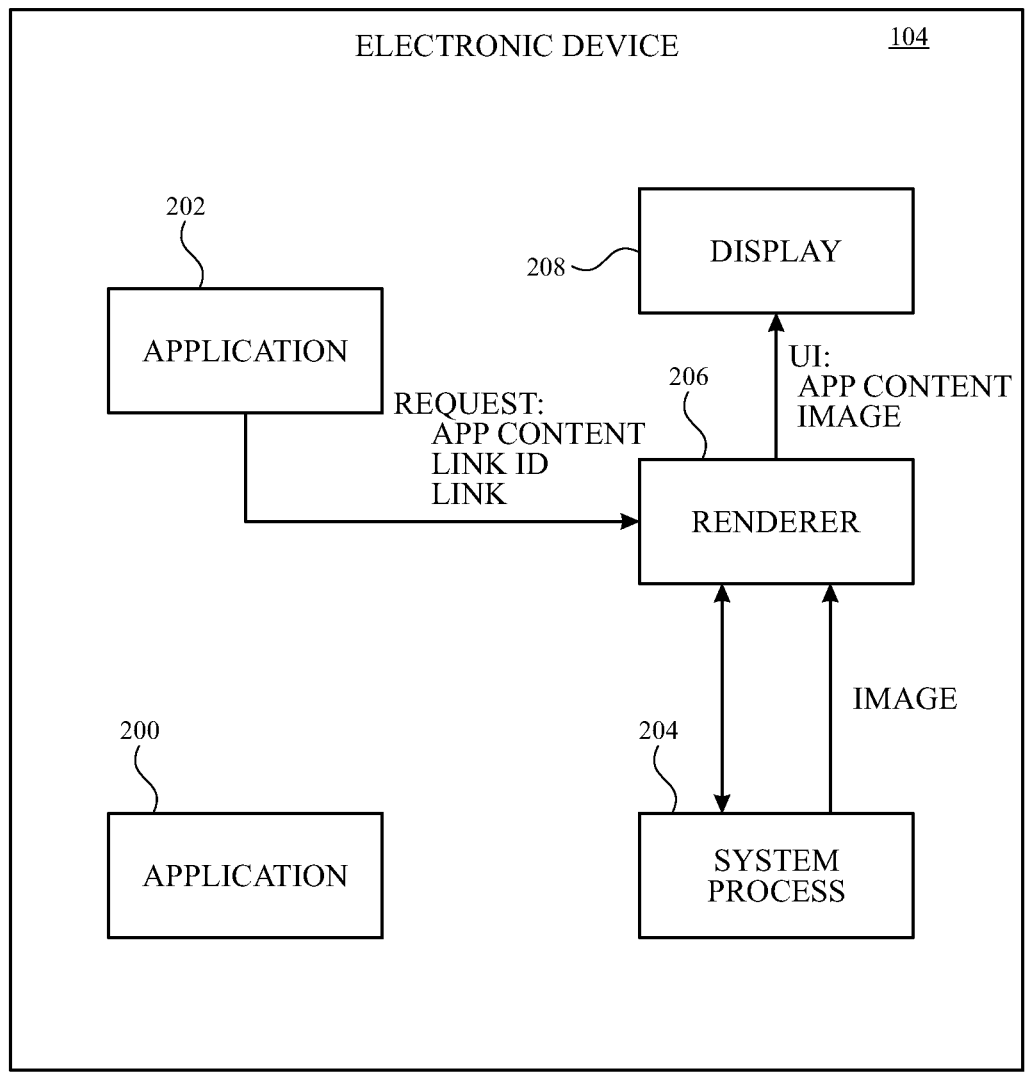

FIGS. 2A and 2B illustrate various aspects of an electronic device in accordance with aspects of the disclosure. In the example of FIGS. 2A and 2B, electronic device 104 includes an application 200 and an application 202 (e.g., each stored in memory at the device and executable by one or more processors of the device). As shown in FIG. 2A, the application 200 may receive network data (e.g., over a network 106 and/or from another electronic device such as electronic device 102). For example, the network data may include a message from electronic device 102, or server data (e.g., a push notification, web content for a web page, social media content, and/or other server data that has been provided to the server by a contact of the electronic device 104 to be obtained by the electronic device 104) from a server such as server 120.

As illustrated in FIG. 2A, the network data may include content (e.g., message content) such as text, images, emojis, videos, or the like. In this example, the network data includes a contact identifier (contact ID), such as a phone number, an email address, or other handle or alias of the contact that originated the network data (e.g., by sending a message to the electronic device 104). In this example, the network data also includes a link, such as a link (e.g., a uniform resource locator (URL), a uniform resource identifier (URI), or other network identifier) to external content that is not included in the network data (e.g., a link to external content that is available from the one or more servers 120). Although links to external data are described herein as an example, it is also appreciated that the link may be a link (e.g., a filename or other data identifier) to the content or a portion of the content that is included in the network data. For example, if a contact corresponding to the contact ID sends a photo to the electronic device 104, an identifier of the photo itself may be linked to the contact ID, in one or more examples.

In one or more implementations, the application 200 may provide a user interface, including the network data content and/or the link, for display (e.g., in a user interface of the application 200) by a display such as display 208. In the example of FIG. 2A, a user interface including the network data content and/or the link is provided to a renderer 206 at the electronic device 102, for rendering for display. However, in other examples, the application 200 may render the user interface including the network data content and/or the link for display, and may provide the rendered UI directly to the display 208. As one illustrative example, in implementations in which the application 200 is a messaging application, the application 200 may provide message content and a link that were included in a received message, for display in a messaging stream with the contact in a messaging user interface of the messaging application.

As shown in FIG. 2, the application 200 may also provide the contact ID and the link to a system process such as system process 204. As shown, the system process 204 may generate a link identifier (link ID) for the link. In one or more implementations, the link identifier may be an alphanumeric identifier for the link received from the application 200, and may be free of any information that identifies the contact or the link itself, including being free of the contact ID. The system process 204 may store a mapping between the link ID and the link. As shown, the system process 204 may provide the link ID (e.g., and the link) to another application such as application 202 (e.g., without identifying the contact that provided the link to the application 202, since the link ID does not include identifying information for the contact).

At a later time, a user of the electronic device 104 may access (e.g., launch or navigate to a user interface for) the application 202. As examples, the application 202 may be a news application, a browser application, a social media application, a streaming application, a media player application, a photos application, or generally any other application that, when accessed, provides information such as application data for output (e.g., display) by the electronic device 104. In one or more implementations, the application 202 may be configured to display, in a user interface of the application 202, information that may be relevant to the link previously received by the application 200. For example, if the link is a link to a news report and the application 202 is a news application, it may be desirable for the application 202 to provide the link to the news report and/or links to related news reports for display when the user accesses the news application (e.g., because receiving the link from the contact may be an indicator that the news report may be relevant to the user of the electronic device 104). In another example, if the link is a link to an image and the application is a photos application, when the user of the electronic device 104 accesses the photos application, the photos application may recommend the image for viewing (e.g., because receiving the image from the contact may be an indicator that image may be relevant to the user of the electronic device 104).

The application 202 may also be configured to indicate the contact from which the link was received, such as when the application 202 provides the link and/or information associated with the link in the user interface of the application 202. For example, the user of the electronic device 104 may be more likely to engage with and/or view the link or the associated information, if the user is informed that the link or the associated information was provided by a particular contact. However, as described herein, even though a contact may have identified their self and their association with the link to the electronic device 104 (by sending the link to the electronic device 104), it may be undesirable (e.g., from a privacy perspective for the contact and/or for an efficiency perspective for the electronic device 104) to propagate the information about the contact that provided the link, to the application 202.

In one or more implementations, the system process 204 may generate an image that includes identifying information of the contact. For example, the system process 204 may include the contact identifier in the image. As another example, the system process 204 may obtain other information associated with contact using the contact identifier (e.g., from a contacts database at the electronic device 104). In scenarios in which the system process 204 obtains other information associated with contact using the contact identifier, the system process 204 may include some or all of the other information associated with the contact in the image. For example, the system process 204 may include a profile photo of the contact in the image. As another example, the system process 204 may include a name associated with the contact in the image. As another example, the system process 204 may include a nickname or other information associated with the contact in the image.

As illustrated in FIG. 2B, a user interface for the application 202 (e.g., a user interface that includes the link received by application 200 and an image including identifying information of the contact that provided the link) can be provided by the electronic device 104, without providing the image or the contact information to the application 202. In the example of FIG. 2B, the application 202 provides a request (e.g., a render request) to the renderer 206 at the electronic device 104. As shown, the render request may include the link identifier that was previously generated by the system process 204 for the link that was received by the application 200. In one or more implementations, the render request may also include the link. In one or more implementations, the render request may also include application content (app content) generated by the application 202, such as images, text, videos, user-interface content or the like. For example, the application content may include a render tree that instructs the renderer 206 where and how to display other application content, the link, and/or information or content in a user interface (UI) for the application 202. For example, the tree provided by the application 202 to the renderer 206 may include information indicating how and where to display the image generated by the system process 204 in connection with the link, in the UI of the application 202.

As indicated in FIG. 2B, the renderer may communicate with the system process 204 to obtain the image (e.g., by providing the link ID received from the application 202 to the system process, and receiving back the image generated by the system process 204 for that link ID and mapped by the system process 204 to that link ID). The system process 204 may render the UI for the application 202 using the application content received from the application 202, and using the image obtained from the system process 204. For example, the renderer 206 may obtain the link ID from the application 202, request the image associated with the link ID from the system process, receive the image associated with the link ID from the system process 204, and render the image and the application content in the UI for the application 202 according to the instructions in the render tree received from the application 202. In this way, the link provided by the contact to the application 200, and information identifying the contact that provided the link, can be included in the UI of another application (e.g., application 202 in this example) without exposing the identity of the contact to the other application.

Figure 3:
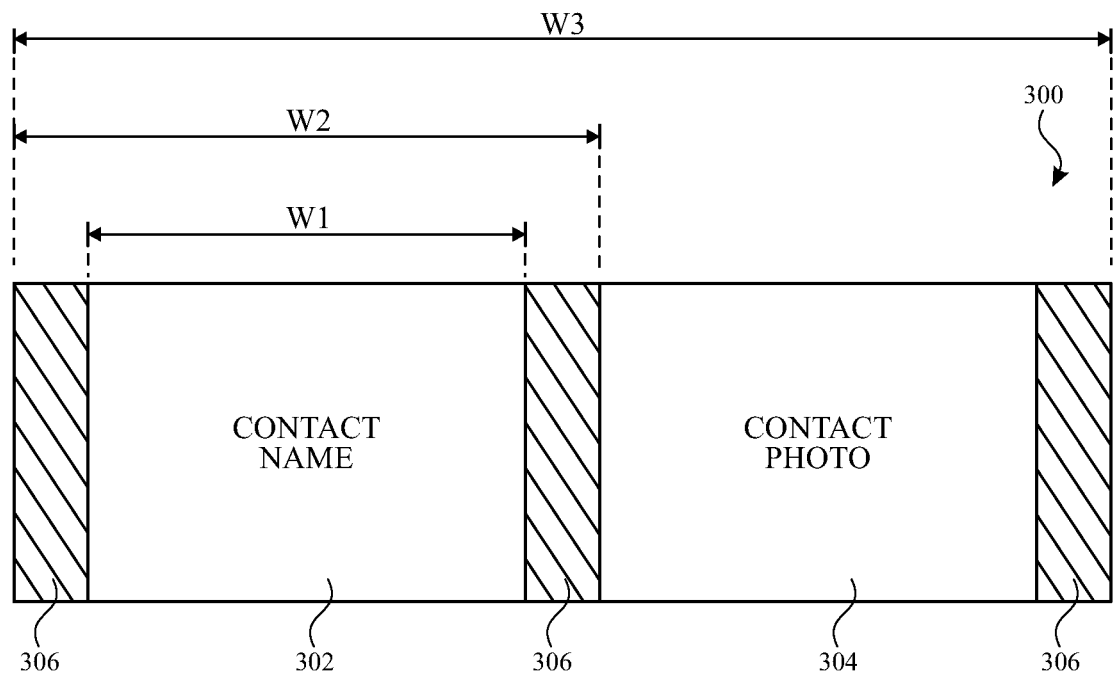
FIG. 3 illustrates a schematic diagram of an example image including identifying information of a user in accordance with one or more implementations.

As an illustrative example, FIG. 3 shows a schematic diagram of an image that may be generated by the system process 204, such as for inclusion in the UI of the application 202. In the example of FIG. 3, the image 300 includes a contact name 302, and a contact photo 304, each corresponding to the contact ID of the contact that provided a link to the application 200 (e.g., as described above in connection with FIG. 2A). For example, the system process 204 may obtain a contact ID, such as a telephone number or an email address, from the application 200 when a link is received by the application 200, and may obtain a contact name 302 and/or a contact photo 304 associated with the contact ID (e.g., from a contacts database at the electronic device 104 or remote from the electronic device, in which the contact name and the contact photo are stored in connection with the contact ID). The system process 204 may then include the contact name 302, the contact photo 304, and/or any other information obtained using the contact ID, in the image 300. In other examples, the contact ID may not be associated with a contact in a contacts database at the electronic device 104, and the system process 204 may include the contact ID itself in the image 300 (e.g., without any other information associated with the contact, such as without a contact name or a contact photo).

FIG. 3 also illustrates an example of how the system process 204 and/or the renderer 206 may modify one or more attributes of the image 300 to obscure one or more attributes of the identifying information of the contact. For example, the system process 204 and/or the renderer 206 may change and/or otherwise control the size of the image 300, in a way that is uncorrelated with the size of the identifying information of the contact. For example, FIG. 3 illustrates how the system process 204 and/or the renderer 206 may generate an image 300 that include regions 306 (e.g., buffer regions) that can be adjusted in height and/or width so that the height and/or width of the image 300, and/or the height and/or width of the portion of the image 300 containing the contact name 302, do not correlate with the length of the contact name 302. In various implementations, the regions 306 may be rendered as whitespace or other colored and/or patterned background space for the contact name and/or the contact photo.

For example, the name of a contact may have a length that varies with the number of characters in the name. For example, when rendered for display in an image, a relatively long name may occupy a wider region of an image than a relatively short name would occupy in the image. In the example of FIG. 3, the image 300 has been rendered so that the width W1 of the contact name 302 does not necessarily correspond to the width W2 of the region of the image in which the contact name 302 is disposed, nor to the overall width W3 of the image 300. Obscuring the attributes of the image 300 and/or the contact name 302 in this way may be advantageous, for example, in preventing the application 202 from determining that several links have been provided by a single contact by tracking the widths W3 of the images 300, and/or or the widths W2 of the portions of the images including the contact name 302, over the course of several links and/or corresponding images.

Figure 4:
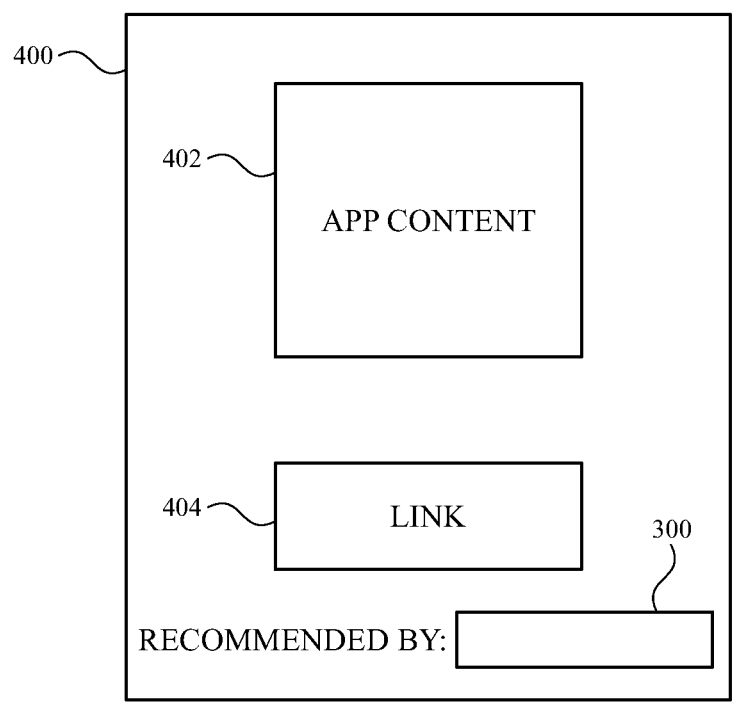
FIG. 4 illustrates a schematic diagram of an example user interface of an application that includes an image including identifying information of a user in accordance with one or more implementations.

As an illustrative example, FIG. 4 shows a schematic diagram of a user interface 400 that includes the image 300 of FIG. 3. For example, the user interface 400 may be a user interface of the application 202 as described above in connection with FIGS. 2A and 2B. As shown, the user interface 400 may include application content 402 (e.g., the application content provided by the application 202 in the render request to the renderer 206), a link 404 (e.g., the link received by the application 200 and/or information associated with the link, such as images and/or other content obtained using the link), and the image 300. In this example, the image 300 includes contact information identifying the contact that previously provided the link 404. In this example, the user interface 400 includes the text "Recommended by:" (as one illustrative example) disposed adjacent to the link 404 and the image 300, to indicate to a viewer of the user interface 400 that the contact identified in the image 300 provided (recommended) the link 404. In one or more implementations, instead of and/or in addition to the link 404, the user interface 400 may include information associated with the link, such as a title or other text descriptor for the link and/or an additional image or images containing information obtained using the link (e.g., an image representative of a news article identified by the link). In one or more implementations, the location of the image 300 in the user interface 400 is determined by a tree (e.g., a render tree) provided by the application 202 to the renderer 206 (e.g., as described above in connection with FIGS. 2A and 2B).

As illustrated in the examples of FIGS. 2A, 2B, 3, and 4, in one or more implementations, the system process 204 at the electronic device 104 generates (i) an identifier (e.g., a link ID) corresponding to a link received by the application 200 at the electronic device from a device of a contact (e.g., a second user of a second electronic device, such as electronic device 102 of FIG. 1), the identifier free of identifying information for the contact, and (ii) an image (e.g., an image 300) including identifying information (e.g., a contact name 302 and/or a contact photo 304) of the contact. In one or more implementations, the system process 204 provides the identifier (e.g., the link ID) to the application 202. In one or more implementations, the renderer 206 at the electronic device 104 (e.g., which is separate from the application 200 and the application 202), receives a render request including the identifier from the application 202, and renders a user interface (e.g., user interface 400) for the application 202 responsive to the request, the user interface including the image 300 and information associated with the link (e.g., including the link 404 itself and/or other information associated with the link). In some examples, the application 200 is a messaging application, and the link is received from a messaging application at the device (e.g., the electronic device 102) of the contact. In one or more implementations, the system process 204 includes a first system process that generates the identifier (e.g., the link ID) and a second system process that generates the image (e.g., the image 300).

Figure 5:
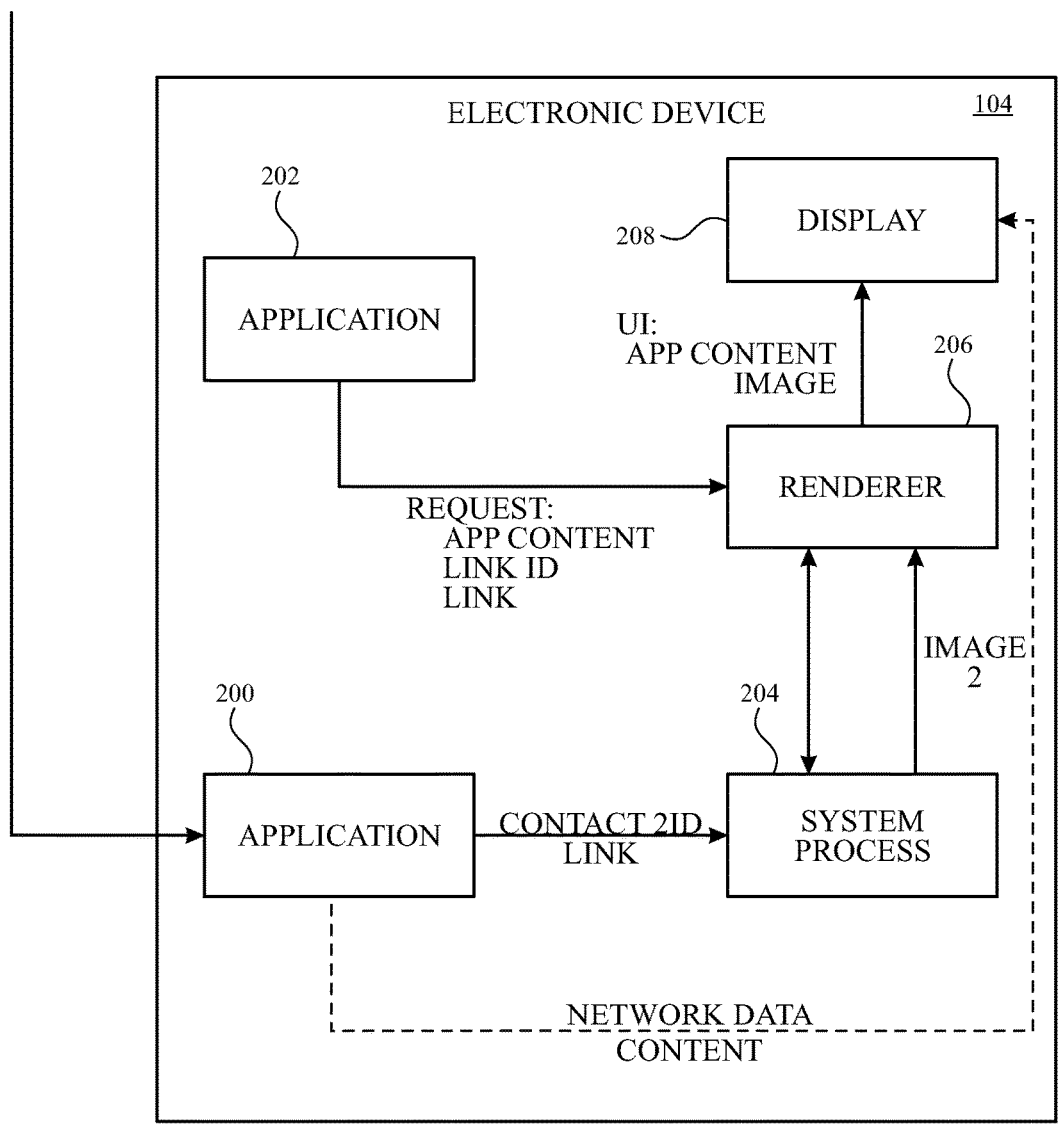
FIG. 5 illustrate a schematic diagram of various additional operations that can be performed by an example electronic device having applications and a system process in accordance with one or more implementations.

In one or more implementations, after generating a link ID and an image 300 corresponding to a link provided by one contact, the electronic device 104 may receive the same link from another device (e.g., the electronic device 108 of FIG. 1) of another contact. For example, FIG. 5 schematically illustrates a scenario in which the electronic device 104 receives the same link received in FIG. 2A in new network data (e.g., "network data 2") that includes the link, new content (e.g., "content 2") and an identifier (e.g., contact 2 ID) of the other contact. In one or more implementations, the electronic device 104 can generate a new link ID and a new image associated with the link and the other contact. However, in one or more other implementations, rather than generating a new link ID and a new image, the system process 204 may associate the other contact (e.g., contact 2 ID) with the previously generated link ID for that same link, and may generate an updated image including the identifying information of the contact and identifying information of the other contact.

As indicated in FIG. 5, in a scenario in which the application 202 requests to render a UI including the link after the link has been again received from another contact, the application 202 can request rendering of the UI for the application 202 using the same (e.g., previously provided) link ID, and the system process 204 provides the updated image (e.g., image 2) including the identifying information of the contact and identifying information of the other contact to the renderer 206 for rendering in the UI. In this way, the application 202 can provide an updated UI with updated information regarding the multiple contacts that provided the link, without receiving any update or associated contact information in connection with the other contact providing the same link.

A similar operation to the operation illustrated in FIG. 5 can be performed when network data from the other user (e.g., the user of the electronic device 108) does not include the same link, but includes a reaction to the same link. For example, the electronic device 104 may receive (e.g., at the application 200 or another application) an indication that the other user of the second device (e.g., the electronic device 108) liked or emphasized a photo, a news story, a blog post, a social media post, or other content corresponding to the link that was previously provided by the first contact, and for which a link ID and an image 300 has been generated by the system process 204 (e.g., as described above in connection with FIGS. 2A and 2B). In one illustrative example, a link may be sent to the electronic device 104 in a group messaging thread, and liked, loved, emphasized, or otherwise reacted to by another participant in the group messaging thread. In such a scenario, the electronic device 104 (e.g., the system process 204) may associate the other contact with the previously generated ID, and generate an updated image including the identifying information of the contact and identifying information of the other contact, as in the case in which the same link was received from the other contact.

Figure 6:
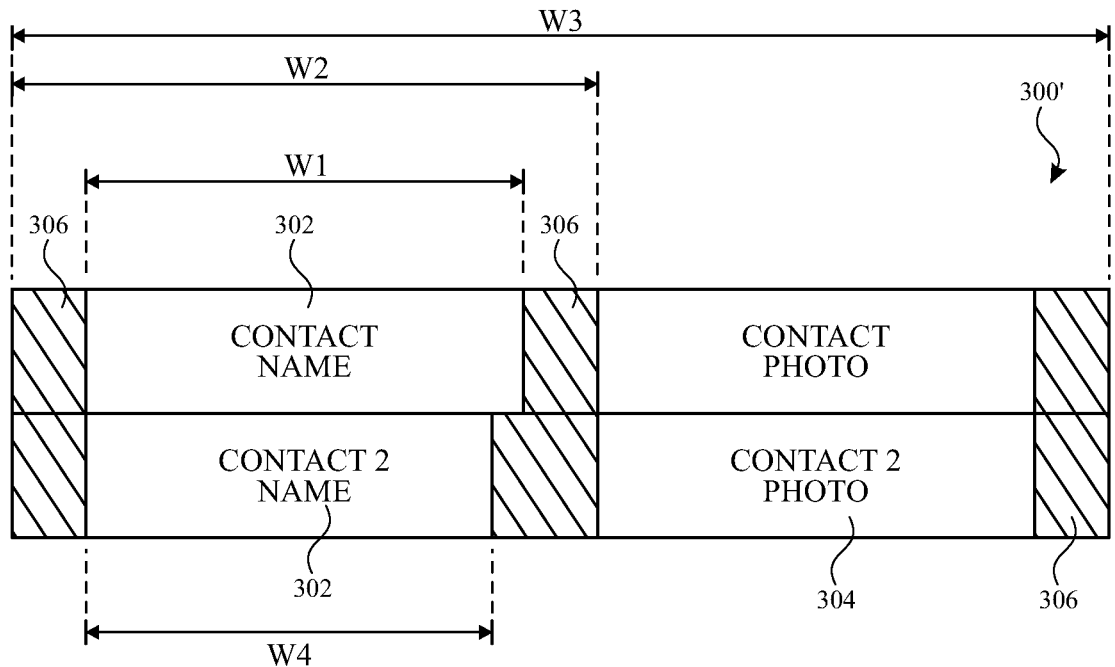
FIG. 6 illustrates a schematic diagram of an example updated image including identifying information of multiple users in accordance with one or more implementations.

FIG. 6 illustrates an example of an updated image 300' that may be generated when a previously received link, or a reaction to a previously received link, is received from another contact. In the example of FIG. 6, the updated image 300 includes the contact name 302 and the contact photo 304 that were included in the image 300 of FIG. 3 and which are associated with the contact ID of the first contact that sent the link, and an additional contact name 302 and an additional contact photo 304 that were included in the image 300 of FIG. 3 and which are associated with the contact 2 ID of the second contact that sent and/or reacted to the link. FIG. 6 also illustrates how the contact name 302 for the second contact, "contact 2 name" has a different width, W4, than the width W1 of the contact name 302 for the first contact, "contact name", but that the width W2 of the portion of the image 300 in which "contact 2 name" is disposed, and the width W3 of the overall image 300 are the same for both contact names 302. In this example, the regions 306 of the image 300 have been adjusted in a way that is uncorrelated to the lengths of the contact names. It is appreciated that the example updated image 300' is merely illustrative and that other (e.g., more or less) information can be included for one or more of the contacts associated with the link, and/or information (e.g., contact names, photos, and/or other information) for more than two contacts related to a link can be included.

The examples of FIGS. 5 and 6 illustrate scenarios in which the same link is received and/or reacted to by two different contacts. In contrast, for example, with the examples of FIGS. 5 and 6, in which the same link is received from multiple different contacts, in a scenario in which the electronic device 104 receives another (e.g., different) link from the device of the same contact that provided a previous link (e.g., the user of the electronic device 102), the electronic device 104 may generate a new link ID for the other link, and may store the new link ID in connection with a new image 300 or in connection with the previous image 300 generated in connection with that contact. Accordingly, in one or more implementations, the electronic device 104 may generate a new link identifier and not a new image when a new link is received from the same contact, and may generate a new image and not a new link identifier when the same link is received from a new contact.

In one or more implementations, the image 300 (e.g., and/or any updated images such as updated image 300') may be generated by the system process 204 in accordance with one or more preferences (e.g., settings or parameters) of the application 202. For example, the image 300 may be generated with a color palette, a theme, a shape, a size, an orientation, a text size, a font, etc. that corresponds to attributes of the UI for that application (e.g., as defined in one or more preferences provided by the application to the system process).

In the examples of FIGS. 2-6, the image 300 is generated by the system process and rendered in the UI of a single application 202. However, it is appreciated that multiple different applications (e.g., a news application, a web browser, a pod cast application, a media streaming application, a photos application, etc.) may include a link received by another application in their user interface, using one or more of the processes described herein. In one or more implementations, the system process 204 may cache multiple versions of the image 300 for multiple applications at the device. In one or more implementations, the system process can generate the multiple versions of the image 300 according to app-specified characteristics (e.g., text size, color scheme, etc.) for each of the multiple applications.

Figure 7:
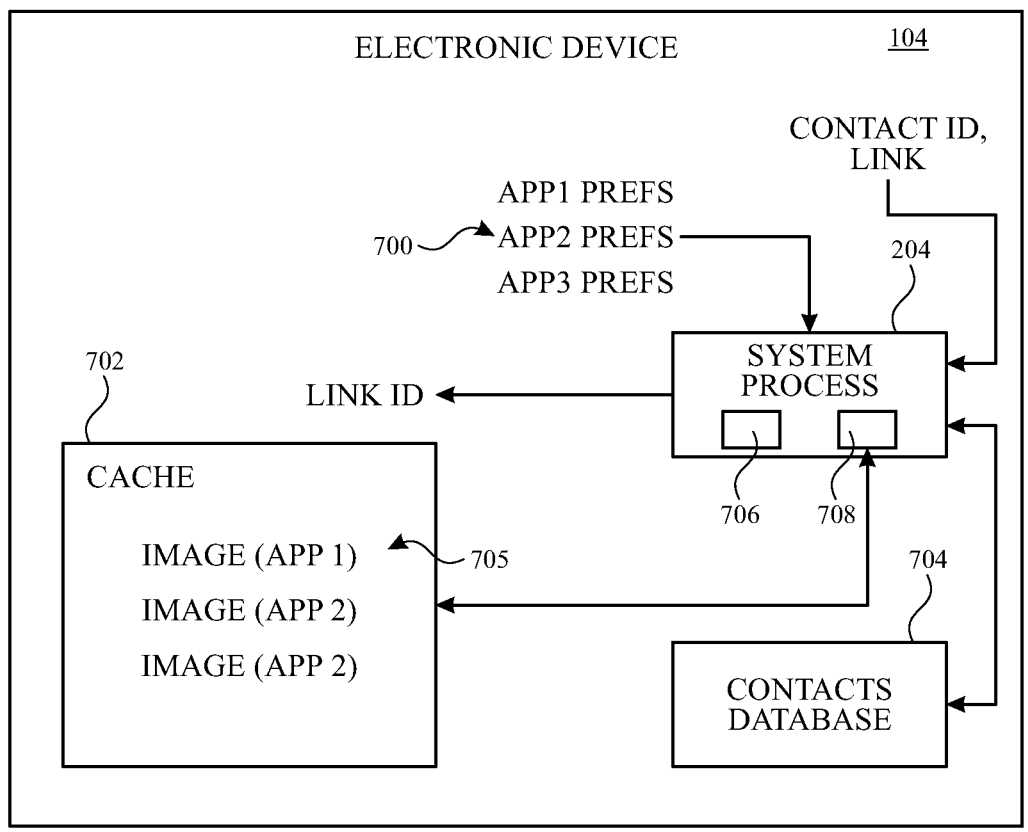
FIG. 7 illustrates a schematic diagram of an example electronic device implementing an image cache in accordance with one or more implementations.

For example, FIG. 7 schematically illustrates a scenario in which the system process 204 receives a contact ID and a link (e.g., from application 200, such as is described above in connection with FIG. 2A), and also receives a multiple application preferences 700 from multiple applications (e.g., "app1 prefs" from a first application such as the application 202, "app2 prefs" from another application, "app 3 prefs" from yet another application, and/or one or more other application preferences from one or more additional applications) that may include the link in an application UI. As illustrated in FIG. 7, the system process 204 may generate multiple versions 705 (e.g., "image (app 1)", "image (app 2)", and "image (app 3)") of an image 300, each including identifying information of the contact corresponding to the contact ID, and each having visual attributes corresponding to the respective received application preferences (e.g., "app1 prefs", "app2 prefs" and, "app 3 prefs", respectively). As shown, the multiple versions 705 of the image 300 may be stored in an image cache 702. The version 705 of the image 300 corresponding to a requesting application (e.g., application 202) can then be obtained by the system process 204 and provided to the renderer 206 when a render request is provided by that application.

FIG. 7 also illustrates how the system process 204 may access a contacts database 704 to obtain contact information (e.g., a contact name 302, a contact photo 304, and/or other contact information) associated with a particular contact ID, for generation of an image 300 and/or one or more versions 705 of the image 300. FIG. 7 also illustrates how the system process 204 may include a first system process 706 that generates the identifier (link ID) for a link, and a second system process 708 that generates the image 300 (e.g., and/or multiple versions 705 of an image 300).

Figure 8:
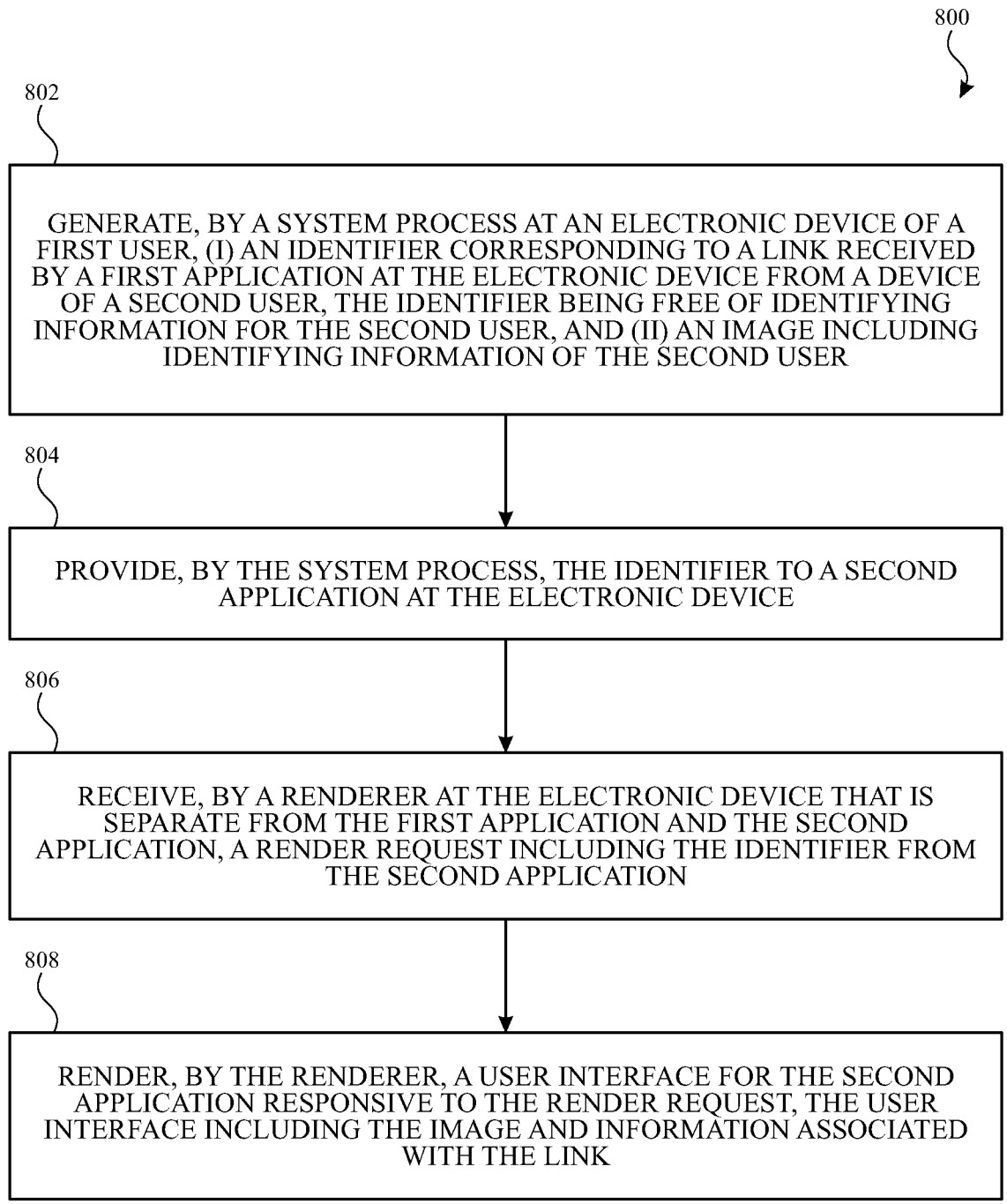
FIG. 8 illustrates a flow diagram of an example process for attribution of network data in accordance with one or more implementations.

FIG. 8 illustrates a flow diagram of an example process 800 including operations that may be performed for privacy-preserving attribution for electronic devices, in accordance with one or more implementations. For explanatory purposes, the process 800 is primarily described herein with reference to the electronic devices 102 and 104 of FIG. 1. However, the process 800 is not limited to the electronic devices 102 and 104 of FIG. 1, and one or more blocks (or operations) of the process 800 may be performed by one or more other components and/or other suitable devices. Further for explanatory purposes, the blocks of the process 800 are described herein as occurring in serial, or linearly. However, multiple blocks of the process 800 may occur in parallel. In addition, the blocks of the process 800 need not be performed in the order shown and/or one or more blocks of the process 800 need not be performed and/or can be replaced by other operations.

At block 802, a system process (e.g., system process 204) at an electronic device (e.g., electronic device 104) of a first user (e.g., an electronic device that is registered to an account of the first user and/or that is signed into the account of the first user) generates, (i) an identifier (e.g., a link ID) corresponding to a link received by a first application (e.g., application 200) at the electronic device from a device (e.g., electronic device 102) of a second user, the identifier being free of identifying information for the second user, and (ii) an image (e.g., an image 300) including identifying information (e.g., a contact name 302, a contact photo 304, and/or other contact information) of the second user. In one or more implementations, the first application is a messaging application, and the link is received from a messaging application at the device of the second user. In one or more implementations, the system process includes a first system process (e.g., first system process 706) that generates the identifier and a second system process (e.g., second system process 708) that generates the image.

In one or more implementations, the identifier (e.g., the link ID) of a link being free of identifying information of the second user means that the identifier of the link includes only information corresponding to the link. For example, the identifier of the link (e.g., the link ID) may be exclusive of identifying information of the second user (e.g., such that the identifying information of the second user is indeterminable from the identifier of the link, and the second user is not identifiable from the identifier of the link).

At block 804, the system process may provide the identifier to a second application (e.g., application 202) at the electronic device. For example, the second application may be a news application, a web browser, a pod cast application, a media streaming application, a photos application, or any other application, different from the first application, that may display the link and/or information associated with the link in a user interface of the application.

At block 806, a renderer (e.g., renderer 206) at the electronic device that is separate from the first application and the second application may receive a render request including the identifier from the second application. For example, the render request may include a tree (e.g., a render tree) that specifies a location for display of the image in the user interface. The render request may also include the link and the information associated with the link. The render request may also include application data from the first application for rendering in the user interface.

At block 808, the renderer may render a user interface (e.g., a user interface 400) for the second application responsive to the render request, the user interface including the image and information associated with the link. For example, the renderer may render the user interface for the application responsive to the render request from the second application and without providing the image to the second application. In one or more implementations, the system process and/or the renderer may modify at least one attribute (e.g., a width) of the image to obscure at least one attribute (e.g., a length in characters) of the identifying information of the second user. For example, modifying an attribute of the image may include changing the size of the image in a way that is uncorrelated with the size of the identifying information of the contact. In one or more implementations, the system process can cache multiple versions (e.g., versions 705) of the image for multiple applications.

In one or more implementations, the electronic device may also receive the link (e.g., the same link) from another device (e.g., the electronic device 108) of a third user. The system process may associate the third user (e.g., a contact identifier of the third user) with the identifier, and generate an updated image (e.g., an updated image 300') including the identifying information of the second user and identifying information of the third user. The system process may later provide the updated image to the renderer in response to receiving the identifier (e.g., based on a later render request from the second application to the renderer).

In one or more implementations, the electronic device (e.g., the system process 204) may also receive a reaction (e.g., a like, an emphasis, a thumbs up, etc.) to the link from another device (e.g., the electronic device 108) of a third user. The system process may also associate the third user (e.g., a contact identifier of the third user) with the identifier, and generate an updated image (e.g., an updated image 300') including the identifying information of the second user and identifying information of the third user. The system process may later provide the updated image to the renderer in response to receiving the identifier (e.g., based on a later render request from the second application to the renderer).

In one or more implementations, the electronic device (e.g., the system process 204) may also receive another link (e.g., different from the link) from the device (e.g., the electronic device 102) of the second user or another device of the second user (e.g., another device associated with the same account to which the device of the second user is associated). The system process may generate a new identifier (e.g., a new link ID) for the other link. The system process may later provide the previously generated image or a new image to the renderer in response to receiving the new identifier (e.g., based on a later render request from the second application to the renderer).

As described herein, aspects of the subject technology may include the collection and transfer of data from an application to other users' computing devices. The present disclosure contemplates that in some instances, this collected data may include personal information data that uniquely identifies or can be used to identify a specific person. Such personal information data can include demographic data, status data, location-based data, calendar data, online identifiers, telephone numbers, email addresses, voice data, audio data, video data, home addresses, images, names, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used in providing an attribution of recommended information to a contact. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates implementations in which users selectively block the use of, or access to, personal information data. That is, the present disclosure contemplates that hardware and/or software elements can be provided to prevent or block access to such personal information data. For example, in the case of providing an attribution of recommended information to a contact, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 9:
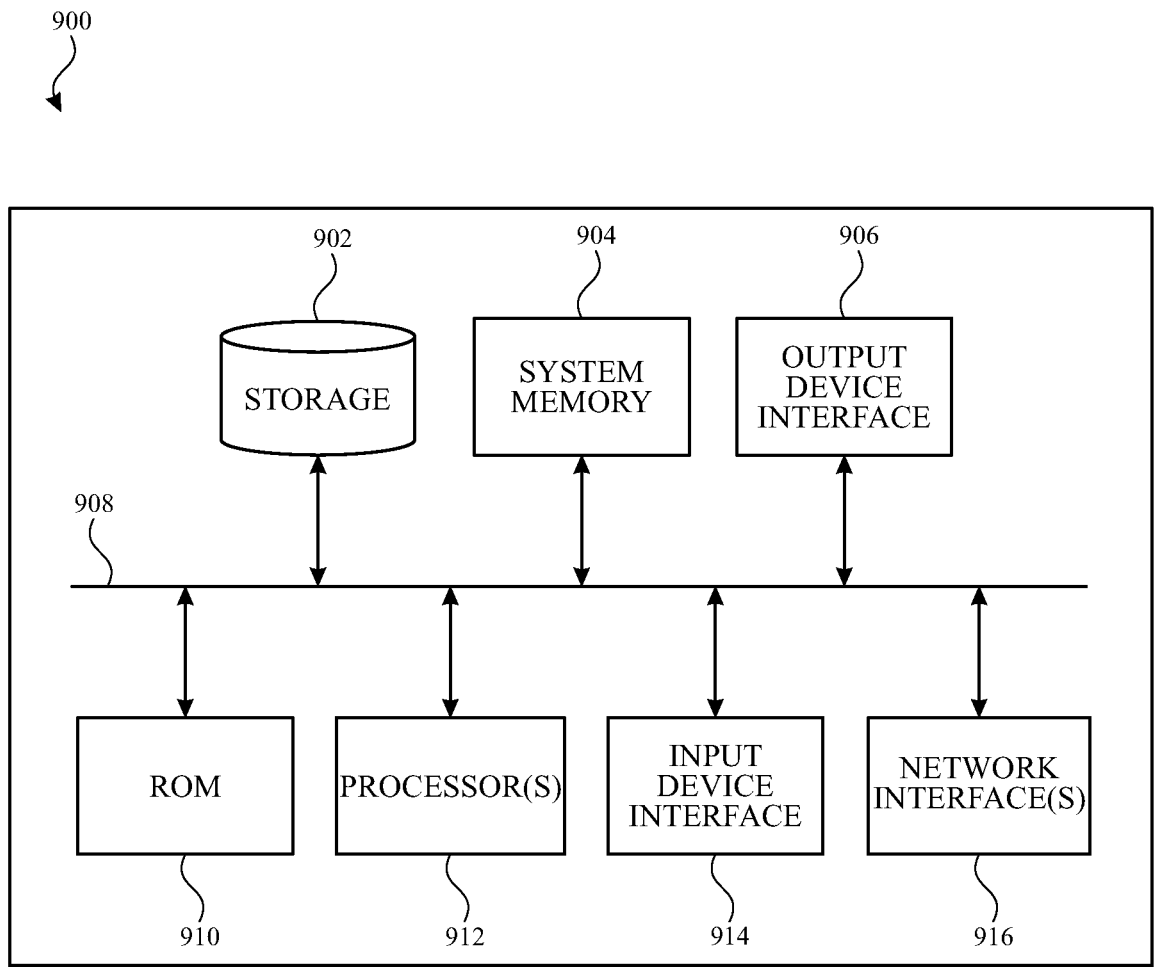
FIG. 9 illustrates an example electronic system with which aspects of the subject technology may be implemented in accordance with one or more implementations.

FIG. 9 illustrates an electronic system 900 with which one or more implementations of the subject technology may be implemented. The electronic system 900 can be, and/or can be a part of, one or more of the electronic devices 102, 104, or 108, or the servers 120 shown in FIG. 1. The electronic system 900 may include various types of computer readable media and interfaces for various other types of computer readable media. The electronic system 900 includes a bus 908, one or more processing unit(s) 912, a system memory 904 (and/or buffer), a ROM 910, a permanent storage device 902, an input device interface 914, an output device interface 906, and one or more network interfaces 916, or subsets and variations thereof.

The bus 908 collectively represents all system, peripheral, and chipset buses that communicatively connect the numerous internal devices of the electronic system 900. In one or more implementations, the bus 908 communicatively connects the one or more processing unit(s) 912 with the ROM 910, the system memory 904, and the permanent storage device 902. From these various memory units, the one or more processing unit(s) 912 retrieves instructions to execute and data to process in order to execute the processes of the subject disclosure. The one or more processing unit(s) 912 can be a single processor or a multi-core processor in different implementations.

The ROM 910 stores static data and instructions that are needed by the one or more processing unit(s) 912 and other modules of the electronic system 900. The permanent storage device 902, on the other hand, may be a read-and-write memory device. The permanent storage device 902 may be a non-volatile memory unit that stores instructions and data even when the electronic system 900 is off. In one or more implementations, a mass-storage device (such as a magnetic or optical disk and its corresponding disk drive) may be used as the permanent storage device 902.

In one or more implementations, a removable storage device (such as a floppy disk, flash drive, and its corresponding disk drive) may be used as the permanent storage device 902. Like the permanent storage device 902, the system memory 904 may be a read-and-write memory device. However, unlike the permanent storage device 902, the system memory 904 may be a volatile read-and-write memory, such as random access memory. The system memory 904 may store any of the instructions and data that one or more processing unit(s) 912 may need at runtime. In one or more implementations, the processes of the subject disclosure are stored in the system memory 904, the permanent storage device 902, and/or the ROM 910. From these various memory units, the one or more processing unit(s) 912 retrieves instructions to execute and data to process in order to execute the processes of one or more implementations.

The bus 908 also connects to the input and output device interfaces 914 and 906. The input device interface 914 enables a user to communicate information and select commands to the electronic system 900. Input devices that may be used with the input device interface 914 may include, for example, alphanumeric keyboards and pointing devices (also called "cursor control devices"). The output device interface 906 may enable, for example, the display of images generated by electronic system 900. Output devices that may be used with the output device interface 906 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 9, the bus 908 also couples the electronic system 900 to one or more networks and/or to one or more network nodes, such as the servers 120 shown in FIG. 1, through the one or more network interface(s) 916. In this manner, the electronic system 900 can be a part of a network of computers (such as a LAN, a wide area network ("WAN"), or an Intranet, or a network of networks, such as the Internet. Any or all components of the electronic system 900 can be used in conjunction with the subject disclosure.

In accordance with aspects of the disclosure, a method is provided that includes generating, by a system process at an electronic device of a first user, (i) an identifier corresponding to a link received by a first application at the electronic device from a device of a second user, the identifier being free of identifying information for the second user, and (ii) an image including identifying information of the second user; providing, by the system process, the identifier to a second application at the electronic device; receiving, by a renderer at the electronic device that is separate from the first application and the second application, a render request including the identifier from the second application; and rendering, by the renderer, a user interface for the second application responsive to the render request, the user interface including the image and information associated with the link.

In accordance with aspects of the disclosure, a non-transitory machine-readable medium is provided storing instructions that, when executed by one or more processors, cause the one or more processors to perform operations that include generating, by a system process at an electronic device of a first user, (i) an identifier corresponding to a link received by a first application at the electronic device from a device of a second user, the identifier being free of identifying information for the second user, and (ii) an image including identifying information of the second user; providing, by the system process, the identifier to a second application at the electronic device; receiving, by a renderer at the electronic device that is separate from the first application and the second application, a render request including the identifier from the second application; and rendering, by the renderer, a user interface for the second application responsive to the render request, the user interface including the image and information associated with the link.

In accordance with aspects of the disclosure, an electronic device is provided that includes memory storing a first application and a second, and one or more processors, where the one or more processors are configured to generate, by a system process at the electronic device, (i) an identifier corresponding to a link received by the first application at the electronic device from a remote device, the identifier free of identifying information for a user of the remote device, and (ii) an image including identifying information of the user of the remote device; provide, by the system process, the identifier to the second application at the electronic device; receive, by a renderer at the electronic device that is separate from the first application and the second application, a render request including the identifier from the second application; and render, by the renderer, a user interface for the second application responsive to the render request, the user interface including the image and information associated with the link.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
   generating, by a system process at an electronic device of a first user, (i) an identifier corresponding to a link received by a first application at the electronic device from a device of a second user, the identifier being free of identifying information for the second user, and (ii) an image including identifying information of the second user;
   providing, by the system process, the identifier to a second application at the electronic device;
   receiving, by a renderer at the electronic device that is separate from the first application and the second application, a render request including the identifier from the second application; and
   rendering, by the renderer, a user interface for the second application responsive to the render request, the user interface including the image and information associated with the link.

2. The method of claim 1, wherein the first application is a messaging application, and wherein the link is received from a messaging application at the device of the second user.

3. The method of claim 1, wherein the system process includes a first system process that generates the identifier and a second system process that generates the image.

4. The method of claim 1, further comprising:
   receiving, by the electronic device, the link from another device of a third user;
   associating, by the system process, the third user with the identifier; and
   generating, by the system process, an updated image including the identifying information of the second user and identifying information of the third user.

5. The method of claim 1, further comprising:
   receiving, by the system process, a reaction to the link from another device of a third user;
   associating, by the system process, the third user with the identifier; and
   generating, by the system process, an updated image including the identifying information of the second user and identifying information of the third user.

6. The method of claim 1, further comprising:
   receiving another link from the device of the second user; and
   generating, by the system process, a new identifier for the other link.

7. The method of claim 1, further comprising:
   modifying, by the renderer, at least one attribute of the image to obscure at least one attribute of the identifying information of the second user.

8. The method of claim 1, wherein the render request includes a tree that specifies a location for display of the image in the user interface.

9. The method of claim 8, wherein the render request also includes the link and the information associated with the link.

10. The method of claim 8, wherein the render request also includes application data from the first application for rendering in the user interface.

11. A non-transitory machine-readable medium storing instructions that, when executed by one or more processors, cause the one or more processors to perform operations that include:
    generating, by a system process at an electronic device of a first user, (i) an identifier corresponding to a link received by a first application at the electronic device from a device of a second user, wherein the identifier is free of identifying information for the second user, and (ii) an image including identifying information of the second user;
    providing, by the system process, the identifier to a second application at the electronic device;
    receiving, by a renderer at the electronic device that is separate from the first application and the second application, a render request including the identifier from the second application; and
    rendering, by the renderer, a user interface for the second application responsive to the render request, the user interface including the image and information associated with the link.

12. The non-transitory machine-readable medium of claim 11, wherein the first application is a messaging application, and wherein the link is received from a messaging application at the device of the second user.

13. The non-transitory machine-readable medium of claim 11, wherein the system process includes a first system process that generates the identifier and a second system process that generates the image.

14. The non-transitory machine-readable medium of claim 11, the operations further comprising:
    receiving, by the electronic device, the link from another device of a third user;
    associating, by the system process, the third user with the identifier; and
    generating, by the system process, an updated image including the identifying information of the second user and identifying information of the third user.

15. The non-transitory machine-readable medium of claim 11, the operations further comprising:
    receiving, by the system process, a reaction to the link from another device of a third user;
    associating, by the system process, the third user with the identifier; and
    generating, by the system process, an updated image including the identifying information of the second user and identifying information of the third user.

16. The non-transitory machine-readable medium of claim 11, the operations further comprising:
    receiving another link from the device of the second user; and
    generating, by the system process, a new identifier for the other link.

17. An electronic device, comprising:
    memory storing a first application and a second application; and
    one or more processors, wherein the one or more processors are configured to:
      generate, by a system process at the electronic device, (i) an identifier corresponding to a link received by the first application at the electronic device from a remote device, wherein the identifier is free of identifying information for a user of the remote device, and (ii) an image including identifying information of the user of the remote device;
      provide, by the system process, the identifier to the second application at the electronic device;

receive, by a renderer at the electronic device that is separate from the first application and the second application, a render request including the identifier from the second application; and render, by the renderer, a user interface for the second application responsive to the render request, the user interface including the image and information associated with the link.

18. The electronic device of claim 17, wherein the one or more processors are further configured to:
modify, by the renderer, at least one attribute of the image to obscure at least one attribute of the identifying information of the user of the remote device.

19. The electronic device of claim 17, wherein the render request includes a tree that specifies a location for display of the image in the user interface.

20. The electronic device of claim 19, wherein the render request also includes the link and the information associated with the link.

21. The electronic device of claim 19, wherein the render request also includes application data from the first application for rendering in the user interface.

* * * * *